March 19, 1963    R. W. GORE    3,082,292
MULTICONDUCTOR WIRING STRIP
Filed Sept. 30, 1957
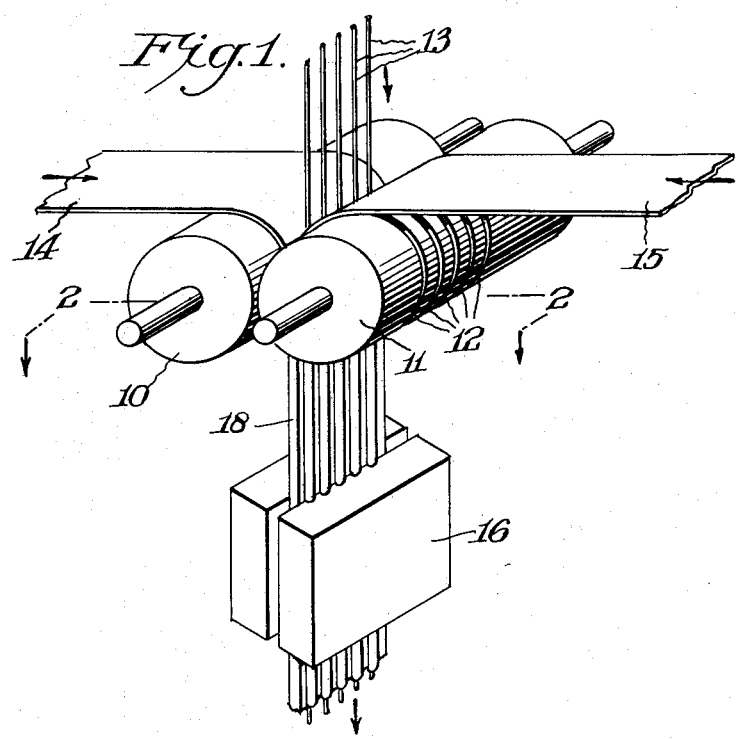
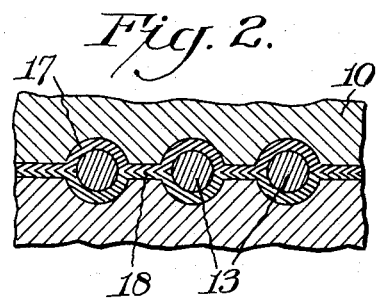
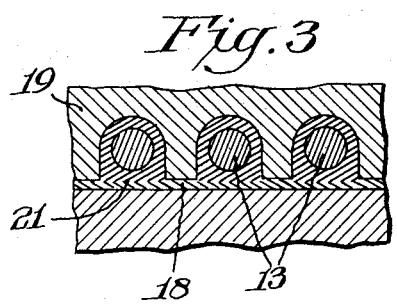
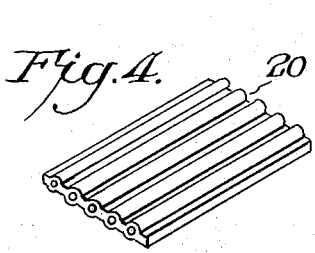
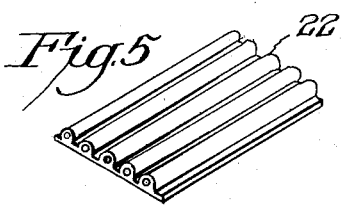
Inventor
Robert W. Gore
By C. H. Mortenson
Attorney

# United States Patent Office 3,082,292
Patented Mar. 19, 1963

3,082,292
MULTICONDUCTOR WIRING STRIP
Robert W. Gore, Newark, Del., assignor to
W. L. Gore & Associates, Inc.
Filed Sept. 30, 1957, Ser. No. 686,900
27 Claims. (Cl. 174—117)

This invention relates to the production of coated articles. More particularly, it relates to a process for coating such articles as wire with plastic materials.

Objects such as electrical conductors are most commonly enclosed in plastic and rubber insulators by either screw or ram extrusion operations in which a melt, paste, plastisol, or uncured elastomeric composition is forced around the conductor as it passes through a die or forming orifice. Great mechanical difficulties have been encountered in attempting to coat more than two or three conductors in a single assembly by these methods.

Furthermore, a number of processes heretofore have had to use the plastic in powder form. Flow rates of powder to the article to be coated had to be carefully controlled. Methods using powders have been used with intractable polytetrafluoroethylene but such methods have not been efficient and economical.

Accordingly, it is an object of this invention to provide an economical and efficient method for encapsulating articles. Another objective is the provision of a method for producing coatings simultaneously on a band of articles, such as a large number of wires. Another objective is the production of thin coatings. A still further object is the provision of an efficient process for making polytetrafluoroethylene coatings. These and other objectives will appear hereinafter.

The objectives of this invention are accomplished by passing the article to be coated into the nip of two converging sheets of the coating material. The surfaces are fed to a pressure element, for example, into the nip of two drive rolls or between two pressure plates, so that a surface of the coating material lies between each roll or plate and the article. The pressure elements, such as the rolls, usually contain in their surfaces cut-out portions such as grooves, which correspond to the contour of the article being coated, and the articles are fed into these sections. The rolls act as pressure or calender rolls. Thus, the articles, such as wires, are fed into hollow sections which become filled by portions of the converging sheets of plastic material as the sheets pass through the apparatus and are pressed together. Generally, the articles are strung up prior to passing the plastic material through the apparatus though this is not essential. While a single article, such as a wire, can be processed, this invention is advantageously used in handling a plurality of articles to be coated.

This invention will be further understood by reference to the figures in which

FIGURE 1 is a perspective showing the converging sheets with a band of wires passing through the resultant nip;

FIGURE 2 is a cross-sectional view, a section on line 2—2, showing the contours of the grooves in the rolls, the position of the wires, the configuration of the sheets and one article made herein;

FIGURE 3, similar to FIGURE 2, shows a different groove shape and a different assembly, the web construction being similar; and FIGURE 4 is an elevation of one article made herein; and FIGURE 5 is an elevation of another assembly of this invention.

As shown in FIGURE 1, a set of opposing cylindrical rolls 10 and 11 are adjusted to a small and specified separation from each other, and contoured with grooves 12 around the circumference of the rolls, these grooves being indexed to fit opposite the grooves on the opposing roll if grooves are cut in both rolls. One or more electrical conductors 13 of relatively uniform cross section are guided into the contoured grooves in the rolls; and two sheets 14 and 15 are fed as shown by the arrows, between the two rolls so that they are formed around the wires and pressed together between each wire to separate each wire into its capsule and seal it there. The assembly is then passed through an oven 16 to sinter the polytetrafluoroethylene if that polymer is being used.

The resultant assembly constitutes at least a single wire uniformly surrounded by the plastic except at the terminals of the grooves where certain ribs or connecting pieces are. If a multitude of wires are processed, the assembly comprises the various wires held together by the ribs or membranes. The assembly is useful as it comes from the apparatus; regardless of the number of wires therein, it can be used directly. Frequently, separation is desired and the assembly is passed to a cutter. The connecting membrane sections are readily removed leaving a continuous, smooth-surfaced length of coated wire. Assembly examples 20 and 22 are shown in FIGURES 4 and 5.

In FIGURE 2 there is shown the relationship of the various parts at the nip. Wires 13 are centered in the grooves and are uniformly surrounded by plastic 17, the connecting membrane being designated at 18. This membrane generally has a thickness less than twice the thickness of the coating. The configuration in FIGURE 3 relates to apparatus in which the grooves are contained entirely in one roll 19. A thicker coating at 21 results. This assembly has the advantage in that it presents a flat surface for mounting of the assembly to flat surfaces, the membrane being used for holding staples and the like.

The process of this invention and the articles made thereby will be further understood by reference to the following examples which are not limitative but are given for illustrative purposes only.

*Example I*

Eight No. 22 gage stranded wires were guided into eight sets of grooves in two opposing rolls six inches in diameter. The rolls were not heated. The grooves were contoured to form a circular cross section about 0.045 inch in diameter at the plane of closest approach of the rolls. The eight sets of grooves were spaced 0.075 inch apart, and the rolls were adjusted so that the ungrooved parts were 0.003 inch apart at the bite. Two tapes of unsintered polytetrafluoroethylene sheet 0.008 inch thick and 1.0 inch wide were guided into the bite of the rolls, one tape on each side of the set of wires. The rolls were revolved so that the sheeting formed around the wires and was pressed tightly together between them to form a 0.003 inch thick web that appeared homogeneous and showed no tendency to separate during handling of the unsintered assembly. The assembly was placed in an oven at 350° C. for a few minutes and then removed and cooled. The assembly was tightly held together and was tough so that it could be flexed and twisted without harming it. The coating thickness around the wires was about 0.008″. No electrical flaws were found when it was immersed in salt water with 3,000 volts potential between the wires and the salt water. The conductors were separated by slitting the web between them and tested individually by immersing them in salt water at 3,000 volts potential. No electrical flaws were found in the insulation.

*Example II*

The procedure of Example I was repeated using one unsintered polytetrafluoroethylene tape colored with 0.1% cadmium red pigment, the other tape being uncolored.

The mechanical qualities appeared unchanged from the structure made in Example I, and no electrical flaws were found at 3,000 volt stress.

Example III

The procedure of Example I was repeated except that two unsintered polytetrafluoroethylene tapes 0.004 inch thick were guided between the wires and rolls on each side of the wires. The seal between the wires appeared homogeneous and strong, both before and after sintering. No electrical flaws were found when the assembly was immersed in salt water and the conductors charged with 3,000 volts.

Similar results are attained when screen is used instead of wires, the rolls being correspondingly grooved circumferentially and longitudinally.

Example IV

The forming procedure of Example I was repeated except that smaller heated rolls were used and 0.005 inch polyethylene tape was used in place of polytetrafluoroethylene. In this experiment, the forming rolls were four inches in diameter, they were constructed of an aluminum core with a polytetrafluoroethylene outside annulus, and they were heated to about 150° C. Again a mechanically sound assembly was formed and no electrical flaws were found at 3,000 volt stress in the salt bath.

Example V

The procedure of Example IV was repeated using plasticized polyvinyl chloride tape. Again a mechanically sound assembly was formed and no electrical flaws were found at 3,000 volt stress in the salt bath.

Example VI

A sheet of unsintered polytetrafluoroethylene sheet 0.007" thick was laid over a section of a die with a ladder-shaped recess cut in it about 0.050" deep. Next a copper sheet, 0.010" thick, cleaned with a bichromate solution and cut to fit the ladder-shaped recess, was placed over the polytetrafluoroethylene sheet so it indexed with the die recess. A second sheet of unsintered polytetrafluoroethylene was placed on top of the copper insert so that it was completely covered by the two polytetrafluoroethylene sheets, and the assembly was pressed with a flat plate so that the two sheets of unsintered polytetrafluoroethylene were compressed together except where the copper insert lay in the die recess. No heat was applied to the die surfaces. The pressure was increased to the point where thickness of the web around the copper insert was decreased from the approximately 0.014" thickness of the two layers of sheet to about 0.008". The assembly was lifted from the die. It was firmly held together where the sheets had been pressed and the copper insert was completely encapsulated in the polytetrafluoroethylene. The assembly was placed in an oven at 350° C. for five minutes and then removed and cooled. The polytetrafluoroethylene was completely fused and became very tough after this baking. No separation occurred where the two sheets were pressed together.

One edge of the copper insert was uncovered by cutting away insulation. The rest of the assembly was immersed in salt water, and 2,000 volts applied between the salt water and the copper insert. No breakdown occurred in the insulation at this voltage.

This process is useful for the manufacture of "printed circuit" types of assemblies, particularly where good electrical properties, toughness, or very high temperature resistance are required. By this invention, articles of irregular shape or assemblies of no symmetry whatsoever can be manufactured using polytetrafluoroethylene as the insulating material.

Example VII

A ladder-shaped piece of copper sheet 0.010" thick was placed between two sheets of unsintered polytetrafluoroethylene sheeting somewhat larger than the copper insert. The edges around the copper sheet and the areas where it was cut out were pressed together by going over them with a small roller about one half inch in diameter, one eighth inch wide. The unsintered polytetrafluoroethylene sheets were quite firmly fastened together by this treatment. The assembly was then placed in an oven at 350° C. for five minutes. The two polytetrafluoroethylene sheets were fused together where they had been pressed by the roller and appeared to be completely homogeneous. The copper sheet was tightly sealed into the polytetrafluoroethylene envelope.

This process is a versatile way to encapsulate electrical components or any device that needs to be protected from a corrosive or harmful environment by encapsulating it in an impervious envelope of polytetrafluoroethylene.

It is very surprising that the intractable polytetrafluoroethylene resin can be pressed together to form the tightly bound assemblies of this invention. Hitherto, no extrusion process was known for intractable polytetrafluoroethylene resin which process would produce coatings free from electrical flaws; such flaws caused break-downs in the insulation when it was subjected to an electrical stress of several thousand volts. Furthermore, heretofore, it has not been feasible to extrude coatings thinner than about 0.008 inch. Thin coatings of good electrical quality can be put on electrical conductors by wrapping them with polytetrafluoroethylene tape and then sintering the wrapped tapes together. However, this is a laborious operation that can be done only at low linear rates along the conductor; only single conductors can be coated by this process; and the coatings are somewhat rough where the spiral wraps overlap. This invention obviates all of these difficulties.

In many applications in the electrical and electronic fields it is necessary to carry a number of conductors from one set of terminal connections to another set some distance away. In doing so, the conductors must be kept insulated from each other and from external objects, and must be identified at each set of terminals. By this invention an assembly of numerous conductors is provided which greatly reduces the labor of stringing out the hookup, allows wiring to be done in smaller channels and passageways, and greatly simplifies the problem of identifying the leads, both in making the original installation and in maintenance and alterations that may be required later.

The sheets or tapes used can be colored differently so that the assembly is made up of sections colored differently. For example, one side may be colored yellow and the other white. Thus, if an installation is made up at terminals with the white side up, one need only number the leads, from left to right, for example, and at the distant point place the white side up and use the same numbering to make the connections at the distant point. If desired, the different colored sheets may be fed running lengthwise side by side preferably with a slight overlap. By so doing, different colored sections can be obtained on one side or on both if desired.

With polytetrafluoroethylene, unsintered sheets of material are used and the rolls are not heated. An unexpected discovery is that these unsintered sheets of polytetrafluoroethylene adhere together very tightly when they are compressed in the bite of the rolls, and the seal remains strong and homogeneous when this plastic envelope around the conductors is sintered by heating it to above 327° C. When the unsintered polytetrafluoroethylene sheets are used as the encapsulating material, the assembly must be heated to a temperature between about 330° C. and about 430° C. to sinter or coalesce the material into a homogeneous structure that has the strength and toughness characteristic of the fused material.

If great assurance is required that no electrical flaws exist in the construction, several sheets of material can be guided into the rolls on each side of the conductors. For example, the feeds going in may comprise two tapes one on top of the other, instead of the single tape or sheet 14 or 15 shown in FIGURE 1. There is little possibility that any flaw in one of the sheets will occur exactly indexed with a flaw in the other sheet or sheets.

Still further, instead of the two sheets 14 and 15 one sheet may be used by folding it and passing it vertically or horizontally to the nip of the rolls with the wire inside the fold. Also, the tapes shown in FIGURE 1 may be fed vertically if desired.

The various types of feed or the different ways of forming the nip of resinous materials apply, of course, to the thermoplastic materials also. These materials include polyethylene, tetrafluoroethylene copolymers such as tetrafluoroethylene/monochlorotrifluoroethylene polymer or tetrafluoroethylene/hexafluoropropylene, polymonochlorotrifluoroethylene, polyvinyl chloride, polyamides, polymerized epsilon-caprolactam, polyformaldehyde, polyvinylidene chloride cellulose acetate, plasticized cellulose acetate butyrate, polyether polymers, and poyvinyl acetate, among others. The thermoplastic materials, such as those exemplified, must be heated in the converging process and are unlike the polytetrafluoroethylene in that respect. The rolls or whatever pressure elements are used may be heated to some extent, if desired, when processing the polytetrafluoroethylene but it is much more advantageous not to heat. It should be recognized that the polytetrafluoroethylene must be unsintered prior to the converging. While some sintering can be tolerated in the converging of the sheets and the articles, it is preferred to minimize this and to effect all the sintering in the subsequent heating step. This affords greater control to the entire process, higher production speeds and lower costs.

While the assemblies can be used in units, the process of this invention may be used to produce single coated articles. The assembly is passed to a cutter, not shown, where it is cut into smaller sections or into singles. It is also possible to effect the separation into singles by exerting sufficient pressure on the rolls so that the web, that is, the sections between the coated articles almost or entirely disappears. The plurality of articles emerge with little or no membrane polymer and they are easily separated. When asemblies are to be produced, the pressure used will be adjusted to get the desired web thickness. Using contoured pressure surfaces for economy purposes, one can readily produce assemblies in which the web or membrane portions have a thickness less than twice the coating thickness.

The heating time need only be long enough to effect the sintering of the polymer. This will depend upon the size of the oven being used, the amount of coated material being sintered, the type of heat and the speed of the traveling coated article While batch sintering can be used, it is preferred to conduct the sintering on a continuous basis. Usually, the time is in the order of only a few seconds but it may be as high as 30 minutes or higher. All that is usually required is sufficient time to get the body heated to the sintering point of the polymer. With the thermoplastics the after-heating is omitted, the coalescing being effected simultaneously with the converging. With polytetrafluoro-ethylene, as well as with others, one will avoid thermally or otherwise degrading the polymer. This is readily done, for at high temperatures heating times are short. Further, particularly effective kinds of heating, such as radiant heating may be employed.

A variety of articles may be processed in accordance with this invention including wires, rods, strips, screen and similar items. It is preferred to process axially symmetrical objects for the attendant ease with which the rolls may be grooved. However, it is not essential that grooved pressure elements, as grooved rolls, be used and unsymmetrical articles may be coated by this invention, for example using smooth rolls. However, membrane thickness increases in such operations, and the consumption of polymer rises. The shapes of the contours or grooves may be slots, circular, rectangular, square, hexagonal, diamond and other shapes.

By this invention electrical conductors are readily encapsulated in a sheath of plastic material. High-quality sheaths can be produced under controlled conditions. For example, it is possible to produce structures hitherto not feasible and to manufacture from polytetrafluoroethylene objects that could not be made before, yet retaining the chemical inertness, dielectric and other desirable properties of the resin. Further, the weight of insulation is minimized. This is important, for example, in aircraft and missile wiring in which thin, high-quality wiring is most essential. Such objects having no electrical flaws are produced by this invention. These desirable articles are made efficiently and economically.

While the invention has been disclosed herein in connection with certain embodiments and certain procedural details, it is clear that changes, modifications or equivalents can be used by those skilled in the art; accordingly, such changes within the principles of this invention are intended to be included within the scope of the claims below.

I claim:

1. A process for coating, in a continuous manner, an article which process comprises passing along their longitudinal axes at least two surfaces of a coating material derived from an unsintered tetrafluoroethylene polymer and in sheet form to and through the nip of two pressure rolls, the said sheets and said rolls being at temperatures below the sintering temperature of the said polymer; simultaneously passing the article to be coated to and through the resultant nip being formed by the said sheets; exerting pressure on the said coating material to enclose the said article in the said material and to bond the said unsintered sheets together when and where they contact each other under pressure in said passage to form at least one web which contains unsintered polymer and which extends longitudinally along the length of the resultant enclosed article and transversely away from it; and withdrawing from the exit side of the rolls the resultant assembly which comprises the said article having a coating of the said unsintered polymer and at least one web.

2. A process in accordance with claim 1 in which said coating material comprises poly(tetrafluoroethylene).

3. A process in accordance with claim 1 in which said coated article is heated after leaving the said rolls to sinter the said polymer in the resultant article.

4. A process in accordance with claim 1 in which the said coated article is heated, after leaving the said rolls and in the absence of applied pressure, to sinter the said polymer in the resultant article at a temperature of about 330° C. to about 430° C.

5. A process in accordance with claim 1 in which said article is an electrical conductor.

6. A process in accordance with claim 1 in which a roll contains a recess corresponding to the shape of the article being coated.

7. A process for coating, in a continuous manner, an article which process comprises passing along their longitudinal axes at least two surfaces of a coating material derived from an unsintered tetrafluoroethylene polymer and in sheet form to and through the nip of two pressure rolls, the said sheets and said rolls being at temperatures below the sintering temperature of the said polymer; simultaneously passing the article to be coated to and through the resultant nip being formed by the said sheets; exerting pressure on the said coating material to enclose the said article in the said material and to bond the said unsintered sheets together when and where they contact each other under pressure in said passage to form at least one web which has a thickness less than the sum of the initial thicknesses of said sheets, which contains unsintered polymer and which extends longitudinally along the length of the resultant enclosed article and transversely away from it; and withdrawing from the exit side of said rolls the resultant assembly which comprises the said article having a coating of the said unsintered polymer and at least one web.

8. A process in accordance with claim 7 in which said coated article is heated, after leaving said element and without applying pressure to said article, to a temperature of at least 327° C. to sinter the tetrafluoroethylene polymer.

9. A process in accordance with claim 7 in which said polymer is poly(tetrafluoroethylene).

10. A process in accordance with claim 7 in which at least two sheets are used, one being of one color and the other being of a different color.

11. A process for coating, in a continuous manner, an article which comprises passing along their longitudinal axes at least two surfaces of a coating material derived from an unsintered tetrafluoroethylene polymer and in sheet form to and through the nip of two pressure rolls containing recesses separated by ridges, the said sheets and the said rolls being at temperatures below the sintering temperature of the said polymer; simultaneously passing the article to be coated to and through the resultant nip being formed by the said sheets and aligned to pass through respective recesses; exerting pressure on the said coating material to enclose the said article in said material and to press the said sheets together, when and where they contact each other under pressure in said passage over said ridges, to a thickness less than the sum of their initial thicknesses to bond the said sheets together in the form of a web which has the said lesser thickness, which contains unsintered polymer and which extends longitudinally along the length of the resultant enclosed article and transversely away from it; and withdrawing from the exit side of said rolls the resultant assembly which comprises the said article coated with polymer that is unsintered and the said web.

12. A process in accordance with claim 11 in which said coating material comprises poly(tetrafluoroethylene).

13. A process in accordance with claim 11 in which a plurality of articles aligned with respective recesses is treated.

14. A process in accordance with claim 13 in which the said pressed sheets form webs which extend between adjacent articles and which hold them together.

15. A process for coating an article which comprises passing along their longitudinal axes at least two surfaces of a coating material derived from an unsintered tetrafluoroethylene polymer and in sheet form to lie between the adjacent, co-acting surfaces of a pressure element, the said sheets and the said elements being at temperatures below the sintering temperature of the said polymer; passing the article to be coated to said pressure element to lie between the said sheets of said material; exerting pressure on the said material around the periphery of said article between the sheets of said material to enclose the said article in the said material; and at the same time bonding by exerting pressure on at least one portion of the said unsintered sheets where they contact each other to form at least one homogeneous, bonded portion and to produce thereby a self-supporting structure, the polymeric material of which is coalescible to form a homogeneously sintered coating of said polymer material around said article.

16. A process in accordance with claim 15 in which said polymer comprises poly(tetrafluoroethylene).

17. A process in accordance with claim 15 which includes the step of heating the said coalescible material at a temperature of about 330° C. to about 430° C. to sinter said polymer.

18. As an article of manufacture, an assembly comprising a plurality of articles coated with a polymer comprising poly(tetrafluoroethylene) as the coating, each article being held in said assembly by webs that extend between adjacent articles, said webs having a thickness less than twice the thickness of the coating.

19. As an article of manufacture, an assembly comprising a plurality of articles coated with a polymer comprising poly(tetrafluoroethylene) as the coating, each article being held in said assembly by webs that extend between adjacent articles, said assembly being of one color on one side and of another color on the other side and said webs having a thickness less than twice the thickness of the coating.

20. A color-coded assembly comprising a plurality of articles, such as conductors, coated with a polymer comprising poly(tetrafluoroethylene); separating each article a web of said polymer which web has a portion coalescible into the respective adjacent polymer that coats a portion of the adjacent article and which web has a thickness less than twice the coating thickness; on one side of said assembly a colored material on said side; and on the other side a different colored material.

21. An assembly in accordance with claim 20 in which said polymer has been sintered.

22. An assembly comprising a plurality of electrical conductors coated with a tetrafluoroethylene polymer, each conductor being coated and being held in said assembly by webs that extend between adjacent conductors, each of said webs having a thickness less than twice the thickness of said coating and said assembly showing no electrical flaws at a stress of 200 volt/mil thickness.

23. An assembly comprising an electrical conductor coated with a tetrafluoroethylene polymer as the coating around said conductor and extending away from said coated conductor a web portion having a thickness less than twice the thickness of said coating, said assembly showing no electrical flaws at a stress of 200 volt/mil thickness.

24. As an article of manufacture, an electrical conductor coated with a tetrafluoroethylene polymer which is in an unsintered form and is bonded by a weld extending longitudinally along the length of said conductor and transversely away from it, said weld comprising at least two overlapped sheets of said polymer compressed to a thickness less than the sum of the initial thicknesses of the elements in the overlap, the said initial thickness of a sheet being measured by the thickness of the coating derived from the respective sheet.

25. A conductor in accordance with claim 24 in which the polymer has been subsequently sintered.

26. A conductor in accordance with claim 24 in which the polymer is poly(tetrafluoroethylene).

27. A conductor in accordance with claim 24 in which the polymer is poly(tetrafluoroethylene) and the said polymer has been subsequently sintered.

References Cited in the file of this patent

UNITED STATES PATENTS

| | | |
|---|---|---|
| 246,407 | McTighe | Aug. 30, 1881 |
| 665,989 | Bechtold | Jan. 15, 1901 |
| 1,291,709 | Angier et al. | Jan. 21, 1919 |
| 1,977,108 | Arnberg | Oct. 16, 1934 |
| 2,112,723 | Wisoff | Mar. 29, 1938 |
| 2,361,374 | Abbott | Oct. 31, 1944 |
| 2,425,294 | Morgan | Aug. 12, 1947 |
| 2,533,501 | Pendleton | Dec. 12, 1950 |
| 2,578,522 | Edgar | Dec. 11, 1951 |
| 2,710,909 | Logan et al. | June 14, 1955 |
| 2,744,041 | Balchen | May 1, 1956 |
| 2,749,261 | Hardison | June 5, 1956 |
| 2,767,113 | Bower | Oct. 16, 1956 |
| 2,786,792 | Mikiska | Mar. 26, 1957 |
| 2,797,729 | Runton | July 2, 1957 |